Dec. 16, 1958  A. A. ASHTON  2,864,240
HYDRAULIC COUPLINGS WITH MEANS PROVIDING FOR
MISALIGNMENT OF INPUT AND OUTPUT SHAFTS
Filed Sept. 21, 1953
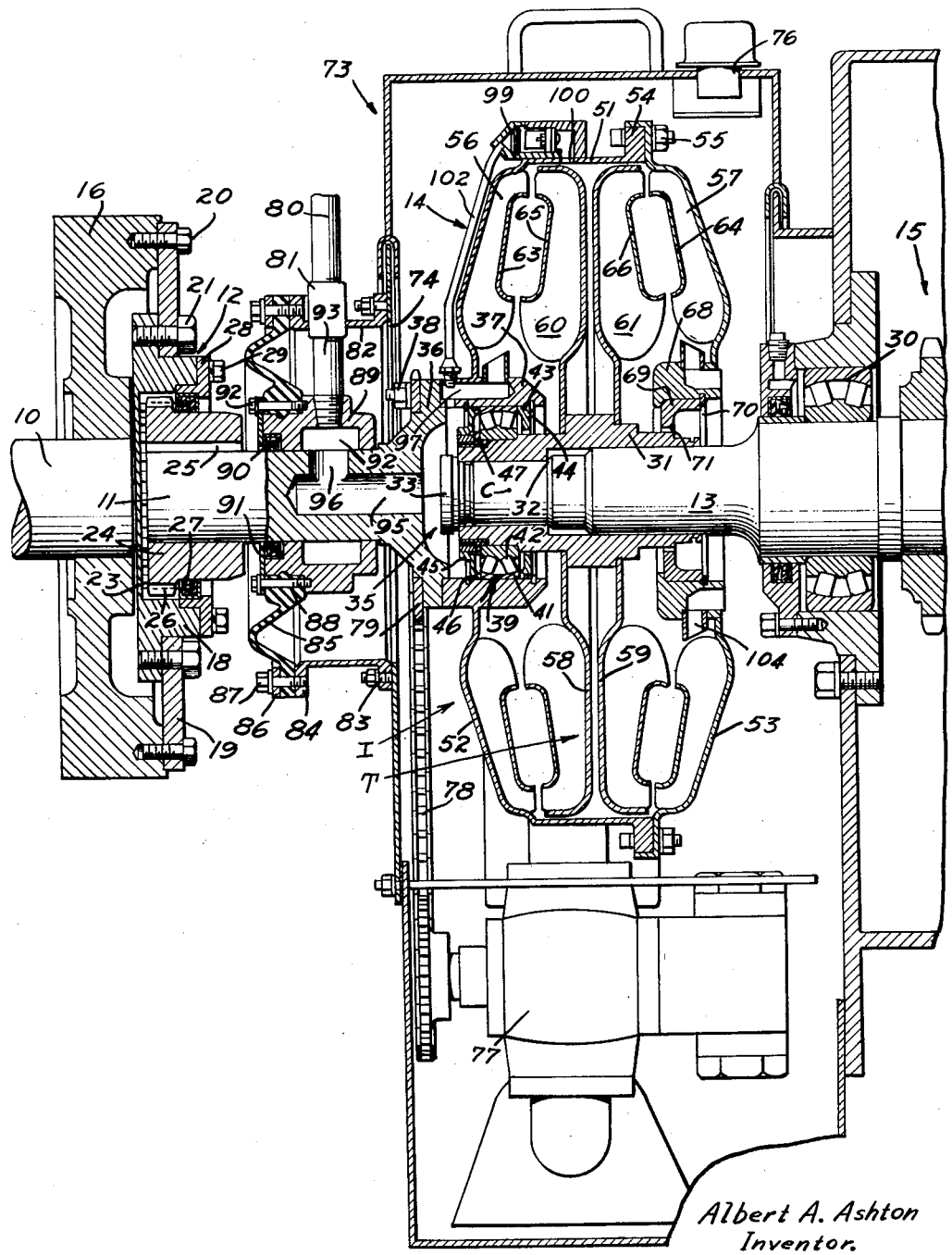
Albert A. Ashton
Inventor.
By
Attorney

United States Patent Office 2,864,240
Patented Dec. 16, 1958

2,864,240

HYDRAULIC COUPLINGS WITH MEANS PROVIDING FOR MISALIGNMENT OF INPUT AND OUTPUT SHAFTS

Albert A. Ashton, Houston, Tex., assignor, by mesne assignments, to The Youngstown Sheet and Tube Company Application September 21, 1953, Serial No. 381,270

4 Claims. (Cl. 60—54)

This invention relates to self-aligning or flexible couplings for transmitting power from a driving to a driven member through a variable speed drive coupling, and has particular utility when employed as a power connection in well drilling rigs.

In heavy equipment such as is used for well drilling purposes, and wherein several rotary mechanisms are arranged with their shafts in end-to-end relation, true alignment of the shafts rarely, if ever, exists. Should the shafts be perfectly aligned at the time of installation, they will in time become misaligned from the stresses and strains of heavy loads met with in drilling operations. Though this misalignment of the shafts may be slight, unless it is properly compensated for, it produces crank action, and rubbing and wear of the parts of the misaligned mechanisms, and cuts down on the efficiency of the mechanisms as well as on their life.

In cases where drive is imparted from an engine shaft to a driven shaft by means of a variable speed drive coupling, it is desirable that the shafts be arranged in a way which will permit adjustment of the shafts upon the occurrence of misalignment without impairing the efficiency of the drive coupling.

It is an object of this invention to provide a variable speed drive coupling which will function efficiently even under conditions of misalignment of the driving and driven shafts associated with such coupling, and will adjust itself to such misalignment in a way to avoid undue stresses and strains on the parts thereof.

It is another object of this invention to provide a flexible shaft coupling arrangement having a floating shaft positioned between driving and driven shafts and wherein one end of said floating shaft is supported by and drivingly associated with the driving shaft, while the other end is supported by said driven shaft and imparts rotation to the driven shaft through a variable speed drive coupling.

Another object of this invention is to provide a fluid coupling for transmitting power from a driving member to a driven member, wherein said driving member is supported by said driven member in a way which allows for slight misalignment of the members.

Still another object of this invention is to provide a fluid coupling having a new and improved arrangement for introducing fluid into the coupling.

Further objects and advantages of the invention will become apparent from the following part of this specification, in which the details of construction and the mode of operation of a preferred embodiment of the invention are described with reference to the attached drawing, which is for illustrative purposes only, and wherein the single figure is a sectional view through the axis of such embodiment as may be employed in a well drilling rig.

The drawing shows a prime mover or engine shaft 10 drivingly connected to the floating driving shaft 11, such connection constituting a flexible coupling designated generally by the numeral 12. A driven shaft is shown at 13, rotation thereof being imparted from the driving shaft 11 through the variable speed drive coupling which, in the embodiment illustrated, constitutes a fluid coupling designated generally by the numeral 14. The driven shaft 13 is shown in association with a compounding transmission 15, only part of which is shown, such compounding transmission being of well-known construction and having especial use in well drilling rigs.

The engine shaft 10 has a flywheel 16 centered on the end thereof and suitably keyed thereto for rotation of the flywheel along with the engine shaft. An annular, internally toothed part 18 of a flexible coupling is secured on the outer face of the flywheel and arranged in axial alignment with the shaft 10 by means of an annular ring 19 and series of peripheral screws 20 and 21.

The shaft 11 has a coupling member 24 suitably keyed thereon as shown at 25. The coupling member extends into the annular part 18 and is provided with a set of teeth 26 on its periphery, which mesh with the teeth 23 of the part 18. A fluid sealing ring 27 is provided around the coupling member 24 to hold lubricant within the part 18, the sealing ring being held in position by a ring 28, which in turn is secured to the rim of the cup 18 by means of screws 29. The engaging sets of teeth in the coupling 12 are formed so as not to mesh tightly, thus permitting the shaft 11 to become misaligned with the engine shaft 10, and providing a flexible drive coupling between the shafts.

The driven shaft 13 is rotatably mounted in suitable bearings, one of which is shown at 30 and is provided with a hub member 31 suitably keyed thereto for rotating the shaft 13 upon rotation of the hub member 31. Axial movement of the hub member with respect to the shaft 13 is prevented by a shoulder 32 on the shaft, and by end rings or ruff 33 on the end of the shaft 13. The shaft 13, along with the hub member 31, extends into a cup 35 formed on the adjacent end of shaft 11. The cup 35 is formed by an annular flange 36 on the end of the shaft 11, and by a cylindrical member 37 secured to the periphery of the outer face of the flange 35 by means of a series of circumferentially arranged screws, one of which is shown at 38. The portion of the hub member 31 which extends into the cup 35 is of smaller diameter than the internal diameter of the cylindrical member 37, to provide an annular space between the hub member and the cylindrical member for accommodating the bearing assembly 39 which supports the cylindrical member of the shaft 11 on the end of the driven shaft 13. The bearing assembly 39 is a ball and socket bearing or so-called self-aligning type permitting angular disalignment of the axes of its inner and outer races, having a socket 41 and rollers 42, the rollers being arranged in arcuate position to cooperate with the arcuate surfaces of the socket 41. Thus, the driving shaft 11 is supported on the end of the driven shaft 13 in a way that permits adjustment of the driving shaft without putting undue strain on the shafts resulting from misalignment of the shafts. The bearing assembly 39 is held in position at one end by a ring 43 and stop ring 44, and at the other end by rings 45 and stop ring 46, there being a fluid sealing ring 47 between the rings 45 and the bearing assembly 39.

The fluid coupling 14 for driving the shaft 13 has an impeller I which substantially completely surrounds or encloses a turbine T. The impeller I for the fluid coupling comprises a cylindrical peripheral wall 51, a front wall 52, and a rear wall 53. An annular flange 54 extends outwardly from the rear end of the cylindrical wall 51, and the rear wall 53 is secured to the flange 54 by a series of circumferentially arranged bolts, one of which is shown at 55. The end wall 52 has a series of annularly arranged cavities divided by radial vanes 56 in the annularly dished portion of the end wall. The similarly dished portion of the rear wall 53 is likewise provided with a series of annularly arranged cavities divided by radial vanes, one of which is shown at 57. The impeller I is supported and centered on the cylindrical member 37 with its axis arranged in a straight line with the axis of the shaft 11. The impeller I of the fluid coupling is made integral with the cylindrical member 37 by welding or otherwise securing the front wall 52 to the cylindrical member, whereby the impeller I is adapted to be rotated by the shaft 11.

The turbine T of the fluid coupling is formed by annular plates 58 and 59 which are centered on and secured to the hub member 31. The annular plate 58 is dished as illustrated in the drawing, to form with the front wall 52 a front chamber of the fluid coupling. The plate 59 is dished similarly as the plate 58 and is faced oppositely of the plate 58 to form a rear chamber of the fluid coupling with the rear wall 53. Each of the annular plates 58 and 59 has a series of annularly arranged cavities divided by radial vanes 60 and 61 respectively.

The impeller vanes 56 are secured to an annular core plate 63 which is spaced within the dished portion of the front wall 52. The series of impeller vanes 57 is similarly provided with an annular core plate 64, spaced within the dished portion of the rear wall 53. In a like manner the turbine T of the twin chambered fluid coupling is provided with annular core plates 65 and 66 which are arranged in substantially mating but spaced apart relation with the core plates 63 and 64 respectively.

The rear wall 53 has a central ring 68 secured thereto and arranged around the shaft 13 and the hub member 31. A restricter ring 69 is fitted within the ring 68 and is held in place by a stop ring 70. The inner diameter of the restricter ring 69 is greater than the diameter of that portion of the hub member 31 which extends within the restricter ring, thereby providing an annular space 71 between the hub member and the restricter ring. Since the housing of the fluid coupling is integral with the cylindrical member 37 on the shaft 11 it will become angularly disposed with respect to the runner rotor thereof and with the driven shaft 13 in a manner corresponding to the action of a universal joint having the point c as its center when offset of the axes of the shafts 10 and 13 occurs. The space 71 between the restricter ring 69 and hub member 31 allows for relative axial misalignment of the housing of the coupling with respect to the driven shaft 13. As the normal misalignment of the several shafts of the well drilling rig is slight, though appreciable from the standpoint of efficiency of the rotary mechanisms, the small annular space 71 is sufficient to accommodate the amount of misalignment normally present when operating such equipment.

I desire to have it understood that the present invention does not require that the means for imparting drive to the driven shaft 13 from the shaft 11 necessarily constitutes a fluid coupling, since the flexible shaft arrangement provided by this arrangement may, if desired, be used with other types of variable speed drive couplings. However, where it is desired to employ a fluid coupling for drivingly connecting the shafts, the present invention provides a simple and improved arrangement for circulating hydraulic fluid into the chamber or chambers of such coupling. As will appear from the description that follows, hydraulic fluid is passed into the chambers of the fluid coupling 14 through passageways formed in the shaft 11. Such passageways communicate with fluid introducing means mounted on the outer casing for the fluid coupling and such means are constructed and arranged to provide continued circulation of fluid at all times and under conditions of axial misalignment of the shafts 11 and 13.

The coupling 14 is enclosed in a casing indicated generally by the numeral 73. An opening 74 is formed in the front wall of the casing 73, and the shaft 11 extends into the casing through such opening for connection with the driven shaft 13. In addition to providing a housing for the coupling 14, the casing 73 constitutes a receptacle for the hydraulic fluid which is circulated from the casing into the chambers of the fluid coupling. Any suitable hydraulic fluid, such as oil for example, may be used, and it is supplied to the casing 73 through a capped opening 76 in the top of the casing. The hydraulic fluid collects in the bottom of the casing from where it is pumped by a circulator pump 77 to a pipe 80, for conducting the fluid to the shaft 11, and thence into the chambers of the fluid coupling. The circulator pump 77 is positioned on the base of the casing 73 and is driven by a chain 78 which passes around the toothed ring 79 secured to the flange 36 of the shaft 11.

The pipe 80 which carries fluid from the circulator pump 77 for delivery to the chambers of the fluid coupling 14, is fitted into a collar 81 which in turn is welded or otherwise secured into an opening provided therefor in an annular flange member 82 around the opening 74 of casing 73. The annular member 82 is secured to the front wall of casing 73 by means of a series of screws, one of which is shown at 83. At its outer end the annular member 82 is formed with an outwardly extending flange 84 to which the periphery of a thick and flexible annular diaphragm 85 is secured by means of a ring 86 and a series of circumferentially arranged screws 87. The diaphragm 85 is formed of rubber or other suitable flexible material and has a thickened bead 88 on its annular periphery, providing a substantial base portion for mounting the diaphragm on a ring member 89 around the shaft 11. The ring member 89 is rotatable with respect to the shaft 11 and is provided with a fluid sealing ring 90 to prevent escape of fluid between the sliding surfaces of the ring member 89 and shaft 11.

The sealing ring 90 is held within a recess provided therefore in the ring member 89 by means of a flat ring 91. The ring 91 also serves to hold the bead or base 88 of the diaphragm 85 to the ring member 89, a series of screws 92 which pass through the flat ring 91, and the bead 88 being provided for securing the ring 91 on the end of the member 89. The ring member 89 is recessed in its inside wall to provide an annular chamber 92 around the shaft 11. Hydraulic fluid from the pipe 80 flows into the chamber 92 through a flexible conduit 93 which is connected on one end thereof into the collar 81, while its other end is screwed into a tapped opening in the ring member 89 for communication with the annular chamber 92. A fluid passageway in the shaft 11 is formed by an axial bore 95 and a radially extending bore 96 opening into the annular chamber 92.

It is clear from the foregoing that though the ring member 89 remains still, with respect to the shaft 11 which rotates within the ring member, the fluid passageway 96 in the shaft 11 is open at all times to the annular chamber 92. Also, it is clear that though the shaft 11 may become misaligned or angularly disposed with respect to the driven shaft 13, such misalignment of the shafts will in no way interfere with the flow of hydraulic fluid from the circulator pump into the fluid passageways in the shaft 11.

The end face of the shaft 11 and the central portion of the end flange 36 are recessed to provide a passageway for hydraulic fluid from the axial bore 95 into the cup 35. Fuid passes from the cup 35 to the front chamber of the fluid coupling through a passageway 97 formed in the cylindrical member 37 of the cup 35. A dump valve 99 is provided on the peripheral wall of the housing of the fluid coupling, the valve 99 communicating with the twin chambers of the coupling through a hole 100 in the peripheral wall 51 of the coupling. Fluid entering the dump valve 99 is discharged into casing 73 to be returned to the passageway 97 by means of pump 77 and a pipe shown at 102 supplies pressure for controlling valve 99. Excess fluid from the rear chamber of the fluid coupling passes through outlets 104 provided in the ring member 68 on the end wall 53 of the fluid coupling, and flows to the bottom of the casing 73 for recirculation into the chambers of the fluid coupling.

I claim:

1. In means for driving a device, having a driven shaft with a projecting portion, from a prime mover: a turbine member fixed on the projecting portion of said shaft; an impeller member surrounding said turbine member; a driving shaft supporting said impeller member for rotation around said turbine member, one end of said driving shaft being flexibly and rotatably supported on the projecting end of said driven shaft by misalignment compensating bearing means, said driving shaft having a passage connecting the interior of said impeller member with a point on the driving shaft spaced from said end thereof; ring means providing an annular chamber around said driving shaft communicating with said passage; a casing surrounding a portion of said driving shaft contiguous to said ring means; a flexible diaphragm surrounding said driving shaft and connecting said casing and said ring means; duct means connecting said annular chamber with a source of fluid to be fed into said impeller member; and a flexible connection on the other end of said driving shaft for connecting it to said prime mover.

2. In means for driving a device, having a driven shaft with a projecting portion, from a prime mover: a turbine fixed on the projecting portion of said shaft; an impeller member surrounding said turbine; a driving shaft supporting said impeller member for rotation around said turbine member, one end of said driving shaft being flexibly and rotatably supported on the projecting end of said driven shaft by misalignment compensating bearing means and the other end thereof having flexible means for connecting it to said prime mover, said driving shaft having a passage connecting the interior of said impeller member with a point on the driving shaft spaced from said end thereof; ring means providing an annular chamber around said driving shaft communicating with said passage; a casing surrounding said impeller and a portion of said driving shaft contiguous to said ring means; a flexible diaphragm surrounding said driving shaft and connecting said casing and said ring means; and duct means connecting said annular chamber with a source of fluid to be fed into said impeller member.

3. In means for driving a device, having a driven shaft with a projecting portion, from a prime mover: a turbine member fixed on the projecting portion of said shaft; an impeller surrounding said turbine member; a driving shaft having on one end thereof a cup receiving the projecting end of said driven shaft and supporting said impeller member for rotation around said turbine member, said cup having a passageway connecting its interior with the interior of said impeller, and said driving shaft having a passage connecting the interior of said cup with a point on the driving shaft spaced from said end thereof; a misalignment compensating bearing between the projecting end of said driven shaft and said cup; ring means providing an annular chamber around said driving shaft communicating with said passage; a casing surrounding said impeller and a portion of said driving shaft contiguous to said ring means; a flexible diaphragm surrounding said driving shaft and connecting said casing and said ring means; and duct means connecting said annular chamber with a source of fluid to be fed into said impeller member.

4. In means for driving a device, having a driven shaft with a projecting portion, from a prime mover: a turbine member fixed on the projecting portion of said shaft; an impeller surrounding said turbine member; a driving shaft having on one end thereof a cup receiving the projecting end of said driven shaft and supporting said impeller member for rotation around said turbine member, said cup having a passageway connecting its interior with the interior of said impeller member, and said driving shaft having a passage connecting the interior of said cup with a point on the driving shaft spaced from said end thereof; a flexible, self-aligning bearing having its inner race fixed on said driven shaft and its outer race fixed within said cup so as to flexibly and turnably mount said end of said driving shaft on the projecting end of said driven shaft and to control axial movement of said driving shaft relative to said driven shaft; ring means providing an annular chamber around said driving shaft communicating with said passage; a casing surrounding a portion of said driving shaft contiguous to said ring means; a flexible diaphragm surrounding said driving shaft and connecting said casing and said ring means; duct means connecting said annular chamber with a source of fluid to be fed into said impeller; and a flexible connection on the other end of said driving shaft for connecting it to said prime mover.

References Cited in the file of this patent

UNITED STATES PATENTS

| | | |
|---|---|---|
| 1,766,520 | Klimek | June 24, 1930 |
| 2,018,616 | Martyrer et al. | Oct. 22, 1935 |
| 2,078,759 | Hacker et al. | Apr. 27, 1937 |
| 2,194,949 | Lysholm | Mar. 26, 1940 |
| 2,264,340 | Sinclair | Dec. 2, 1941 |
| 2,264,341 | Sinclair et al. | Dec. 2, 1941 |
| 2,389,441 | La Brie | Nov. 20, 1945 |
| 2,536,473 | Sinclair | Jan. 2, 1951 |
| 2,569,087 | Alexandrescu | Sept. 25, 1951 |
| 2,651,919 | Venstrom | Sept. 15, 1953 |